(12) United States Patent
O'Brien et al.

(10) Patent No.: US 8,411,720 B2
(45) Date of Patent: Apr. 2, 2013

(54) SYSTEM AND METHOD FOR AUTOMATIC GAS OPTIMIZATION IN A TWO-CHAMBER GAS DISCHARGE LASER SYSTEM

(75) Inventors: Kevin Michael O'Brien, San Diego, CA (US); Joshua Jon Thornes, San Diego, CA (US); Daniel Jason Riggs, San Diego, CA (US); Rui Jiang, San Diego, CA (US)

(73) Assignee: Cymer, Inc., San Diego, CA (US)

( * ) Notice: Subject to any disclaimer, the term of this patent is extended or adjusted under 35 U.S.C. 154(b) by 118 days.

(21) Appl. No.: 13/174,640

(22) Filed: Jun. 30, 2011

(65) Prior Publication Data

US 2013/0003773 A1 Jan. 3, 2013

(51) Int. Cl.
*H01S 3/22* (2006.01)

(52) U.S. Cl. ............... 372/55; 372/56; 372/57; 372/58; 372/60

(58) Field of Classification Search ................. 372/55, 372/56, 57, 58
See application file for complete search history.

(56) References Cited

U.S. PATENT DOCUMENTS

| | | | |
|---|---|---|---|
| 6,128,323 A | 10/2000 | Myers et al. | |
| 6,240,117 B1 | 5/2001 | Gong et al. | |
| 6,330,261 B1 | 12/2001 | Ishihara et al. | |
| 7,039,086 B2 | 5/2006 | Fallon et al. | |
| 7,079,564 B2 | 7/2006 | Fallon et al. | |
| 2002/0085606 A1* | 7/2002 | Ness et al. | 372/55 |
| 2006/0056478 A1 | 3/2006 | Albrecht et al. | |
| 2008/0004609 A1 | 1/2008 | Horvath | |
| 2008/0205472 A1 | 8/2008 | Dunstan et al. | |
| 2010/0309939 A1* | 12/2010 | Jacques et al. | 372/29.015 |
| 2011/0079736 A1* | 4/2011 | Hansson et al. | 250/504 R |

FOREIGN PATENT DOCUMENTS

WO WO2008105988 A2 9/2008

* cited by examiner

*Primary Examiner* — Dung Nguyen
(74) *Attorney, Agent, or Firm* — Gard & Kaslow LLP (57) ABSTRACT

A system and method for automatically performing gas optimization after a refill in the chambers of a two chamber gas discharge laser such as an excimer laser is disclosed. The laser is continuously fired at a low power output, and the gas in the amplifier laser chamber bled if necessary until the discharge voltage meets or exceeds a minimum value without dropping the pressure below a minimum value. The power output is increased, and the gas bled again if necessary until the voltage and pressure meet or exceed the minimum values. The laser is then fired in a burst pattern that approximates the expected firing of the laser in operation, and the gas bled if necessary until the discharge voltage meets or exceeds the minimum value and the output energy meets or exceeds a minimum value, again without dropping the pressure in the chamber below the minimum value. Once the minimum values are provided, the process runs quickly without manual interaction.

21 Claims, 5 Drawing Sheets

SYSTEM AND METHOD FOR AUTOMATIC GAS OPTIMIZATION IN A TWO-CHAMBER GAS DISCHARGE LASER SYSTEM

FIELD OF THE INVENTION

The present invention relates generally to laser systems. More specifically, the invention relates to optimizing the gas in the chambers of a two chamber gas discharge laser such as a Master Oscillator-Power Amplifier excimer laser after a refill operation.

BACKGROUND OF THE INVENTION

One type of gas discharge laser used in photolithography is known as an excimer laser. An excimer laser typically uses a combination of a noble gas, such as argon, krypton, or xenon, and a reactive gas such as fluorine or chlorine. The excimer laser derives its name from the fact that under the appropriate conditions of electrical stimulation and high pressure, a pseudo-molecule called an excimer (or in the case of noble gas halides, an exciplex) is created, which can only exist in an energized state and can give rise to laser light in the ultraviolet range.

Excimer lasers are widely used in high-resolution photolithography machines, and are thus one of the critical technologies required for microelectronic chip manufacturing. Current state-of-the-art lithography tools use deep ultraviolet (DUV) light from the KrF and ArF excimer lasers with nominal wavelengths of 248 and 193 nanometers respectively.

While excimer lasers may be built with a single chamber light source, the conflicting design demands for more power and reduced spectral bandwidth have meant a compromise in performance in such single chamber designs. One way of avoiding this design compromise and improving performance is by utilizing two chambers. This allows for separation of the functions of spectral bandwidth and pulse energy generation; each chamber is optimized for one of the two performance parameters.

Such dual-gas-discharge-chamber excimer lasers are often called Master Oscillator-Power Amplifier, or "MOPA," lasers. In addition to improving the spectral bandwidth and pulse energy, the efficiency of the dual chamber architecture can enable the consumable modules in MOPA lasers to reach longer operational lifetimes than their counterpart modules in single chamber light sources.

In each chamber, as the light source discharges energy across its electrodes to produce light, the halogen gas, fluorine in the case of ArF or KrF lasers, is depleted. This causes a decrease in the laser efficiency which is seen, for example, as an increase in discharge voltage required to create a given desired pulse energy. Since the discharge voltage has an upper limit determined by physical constraints of the hardware, steps must be taken to replenish the lost fluorine so that the voltage remains below this limit and the laser continues to function properly.

One way to do this is with a full replenishment of the gas in the chambers, called a refill, where all of the gas is replaced while the laser is not firing to return the gas content in the chamber to the desired mix, concentration and pressure. However, refills are extremely disruptive as the laser be shut off during the refill process, and thus the lithographic exposure of chips must also be paused in a controlled manner at the same time and then restarted when the laser is again operational to avoid improper processing of the chips. For this reason, it is typical to refill both chambers at once to save time, although this is not necessary.

The need for a refill can depend on several complex and often unpredictable variables, including the light source firing pattern and energy, the age of the light source modules, and others that will be familiar to those of skill in the art. For this reason, refills are typically done on a regular schedule, which ensures that the light source operation will never suffer unanticipated interruption due to the light source reaching its operational limit. Such a regular schedule generally yields very conservative upper limits on the time between refills, such that some users of the light source operating at low pulse usages might be able to wait for a much longer period of time between refills than is provided by the simple schedule.

Given the demands of increased throughput and light source availability, efforts have been made to minimize light source stoppage for refills. One way of doing this is by performing a partial replenishment of the gas in the chambers, known as an inject, rather than a full refill. As long as the laser is able to continue to operate within certain parameters, it is not necessary to shut the laser down for the inject, and thus processing of chips may continue during the inject process. However, the performance of the laser still tends to change over time in such a way that injects become inadequate to compensate, and so refills are still performed at regular intervals.

In a refill operation, the remaining gas in the laser chambers is evacuated, and then new gas is introduced into the chambers in an amount intended to arrive at a particular pressure and concentration of fluorine. The pressure and concentration of gas in the laser chambers at the end of a refill is typically determined by the specific type and model of laser (and may even be similar for all dual chamber lasers), and cannot take into account the particular characteristics of a specific laser, such as its age.

Accordingly, a refill may be followed by gas optimization, which is intended to provide the best gas conditions for initial operation of the specific laser. Optimizing the gas allows the specific laser to begin operation at its most efficient point, allowing for longer operation before another refill is required.

Optimization is not always done, in part due to the time required. A refill and optimization typically takes about an hour or more, again with the laser having stopped operation. Rather, whether optimization is done is typically determined by various criteria, such as whether there have been major laser module replacements, or whether there is an observed degradation in the performance of the laser.

To optimize the gas, an engineer test-fires the laser to determine its operating parameters, in particular the discharge voltage and the output energy. If the laser is not operating within the desired parameters, the engineer adjusts the gas in the chambers, and another test-fire done. This is repeated until the desired operating parameters are obtained.

There are some issues inherent in performing gas optimization. The optimization process is typically one of trial and error, so that even an experienced engineer will have some difficulty in obtaining the optimal gas state. This also means that optimization is not easily repeatable; different engineers may produce different optimizations of the same laser, and even a single engineer may not be able to replicate an earlier result. Finally, if errors are made, it may be necessary to repeat the optimization process, resulting in additional downtime of the laser.

A more accurate method of optimizing the gas would mitigate or eliminate many or all of these issues, and allow the laser to operate for a longer period of time before another refill must be performed. Further, a good optimization provides a better basis on which to base the calculation of subsequent injects to the laser chambers. It is thus desirable that optimization be performed in a fashion that results in the most efficient gas state for the particular laser used. The described gas optimization may be particularly effective with an automatic refill process that provides a highly accurate fluorine concentration.

SUMMARY OF THE INVENTION

A system and method for automatically and accurately optimizing the gas in the power amplifier laser chamber of a two chamber gas discharge laser such as a MOPA excimer laser after the chambers have been refilled is disclosed. Certain desired parameters are defined, and a controller or processor then performs the optimization without intervention or action by the user. The laser is test fired in several sequences, and gas bled from the amplifier laser chamber during each sequence, if necessary, to keep the operating parameters of the laser within the defined parameters to the extent possible, resulting in a gas condition in the amplifier laser chamber as close to optimal as possible given the conditions existing at the end of the gas refill.

In one embodiment, a dual chamber gas discharge laser light source is described, comprising a master oscillator and an amplifier, each of the master oscillator and amplifier having a laser chamber containing a lasing medium gas comprising a halogen, and a gas optimization system including a controller automatically executing a gas optimization scheme after a refill, the gas optimization scheme comprising: a first sequence in which the laser is fired in continuous mode at a first rate and target energy while measuring the discharge voltage, and, if the discharge voltage is below a predetermined minimum value, bleeding gas from the amplifier chamber until the discharge voltage is equal to or greater than the minimum value; a second sequence in which the laser is fired in continuous mode at a second rate and target energy while measuring the discharge voltage, and, if the discharge voltage is below the predetermined minimum value, bleeding gas from the amplifier chamber until the discharge voltage is equal to or greater than the minimum value; and a third sequence in which the laser is fired in bursts at a target energy while measuring the discharge voltage and master oscillator output energy, and, if the discharge voltage is below the predetermined minimum value, or the output energy is below another predetermined minimum value, bleeding gas from the amplifier chamber until both the discharge voltage and the output energy are equal to or greater than the respective predetermined minimum values.

In another embodiment, a method of automatically optimizing the gas in the power amplifier laser chamber of a dual chamber gas discharge laser light source having a master oscillator and a power amplifier is described, each of the master oscillator and amplifier having a laser chamber containing a lasing medium gas comprising a halogen, the method of optimizing the gas comprising the steps of: firing the laser in continuous mode at a first rate and target energy while measuring the discharge voltage, and, if the discharge voltage is below a predetermined minimum value, bleeding gas from the amplifier chamber until the discharge voltage is equal to or greater than the minimum value; firing the laser in continuous mode at a second rate and target energy while measuring the discharge voltage, and, if the discharge voltage is below the predetermined minimum value, bleeding gas from the amplifier chamber until the discharge voltage is equal to or greater than the minimum value; and firing the laser in bursts at a target energy while measuring the discharge voltage and output energy, and, if the discharge voltage is below the predetermined minimum value, or the output energy is below another predetermined minimum value, bleeding gas from the amplifier chamber until both the discharge voltage and the output energy are equal to or greater than the respective predetermined minimum values.

Still another embodiment discloses a non-transitory computer-readable medium having embodied thereon a program, the program being executable by a processor to perform a method of automatically optimizing the gas in the power amplifier laser chamber of a dual chamber gas discharge laser light source having a master oscillator and a power amplifier is described, each of the master oscillator and amplifier having a laser chamber containing a lasing medium gas comprising a halogen, the method of optimizing the gas comprising the steps of: firing the laser in continuous mode at a first rate and target energy while measuring the discharge voltage, and, if the discharge voltage is below a predetermined minimum value, bleeding gas from the amplifier chamber until the discharge voltage is equal to or greater than the minimum value; firing the laser in continuous mode at a second rate and target energy while measuring the discharge voltage, and, if the discharge voltage is below the predetermined minimum value, bleeding gas from the amplifier chamber until the discharge voltage is equal to or greater than the minimum value; and firing the laser in bursts at a target energy while measuring the discharge voltage and output energy, and, if the discharge voltage is below the predetermined minimum value, or the output energy is below another predetermined minimum value, bleeding gas from the amplifier chamber until both the discharge voltage and the output energy are equal to or greater than the respective predetermined minimum values.

DETAILED DESCRIPTION OF THE INVENTION

The present application describes a system and method for automatically and accurately optimizing the gas in the amplifier chamber of a two chamber gas discharge laser such as a MOPA excimer laser after a refill of the chambers. It is expected that a fully automated optimization process will result in increased accuracy and mitigate or eliminate many of the issues associated with manual optimization.

Once certain defined parameters are entered, the process is run by, for example, a controller, without intervention or action by the user. The laser is test fired in several sequences, and gas bled from the amplifier laser chamber during each sequence, if necessary, to keep the operating parameters of the laser within the defined parameters to the extent possible. This results in the gas condition in the amplifier laser chamber being as close to optimal as possible given the conditions existing at the end of the gas refill.

Figure 1:
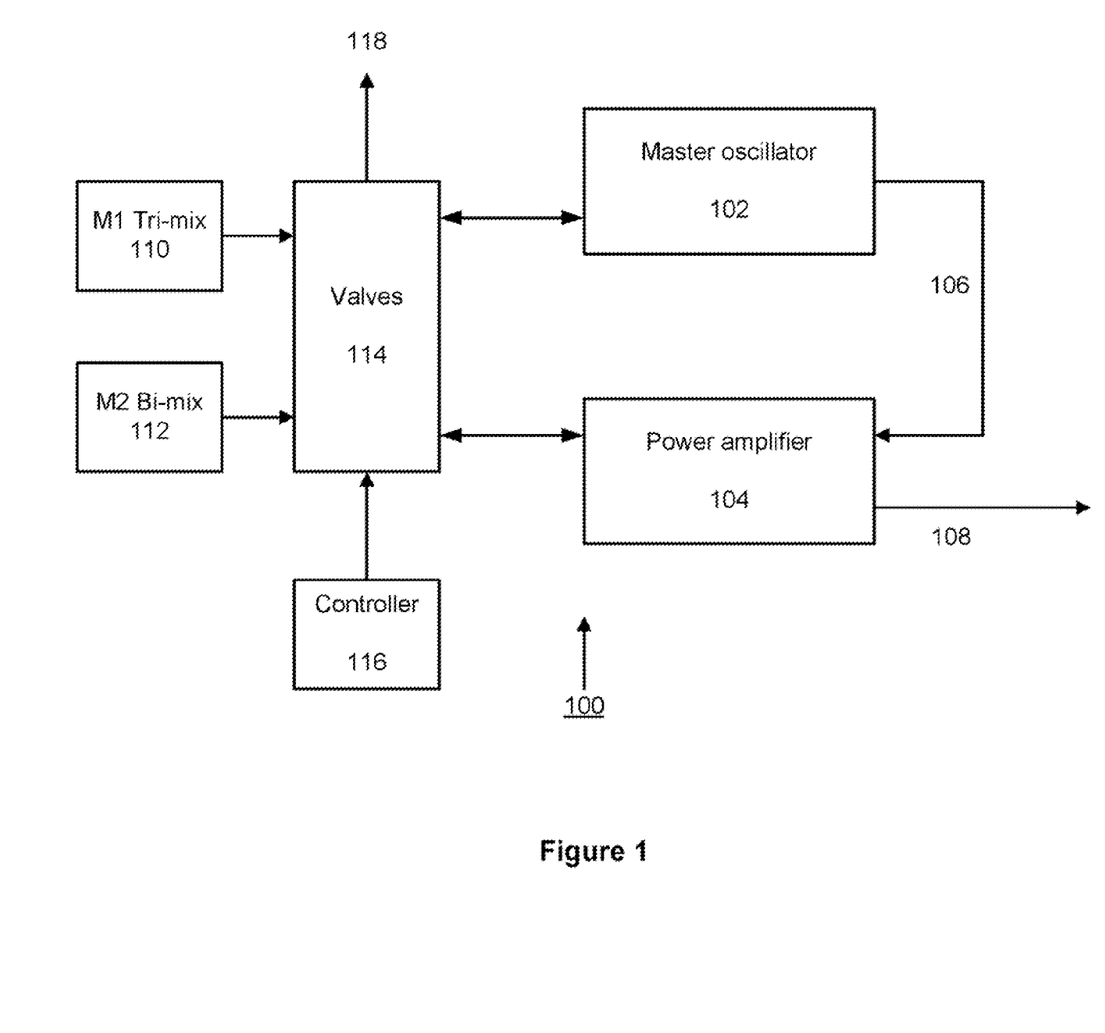
FIG. 1 shows a simplified block diagram of an automatic gas refill system 100 for a dual chamber gas laser, such as a MOPA excimer laser, according to one embodiment.

A simplified block diagram of a gas replenishment system 100 for a dual chamber gas laser, such as a MOPA excimer laser, is shown in FIG. 1. The MOPA excimer laser has a master oscillator 102 containing a laser chamber, and a power amplifier 104 also containing a laser chamber. In operation, the master oscillator 102 produces a first laser beam 106 which is passed to the power amplifier 104 where it is amplified, to produce an amplified laser beam 108 which is output to a scanner machine (not shown) for use in lithography.

Each laser chamber contains a mixture of gases; for example, in a given excimer laser each laser chamber might contain a halogen, e.g., fluorine, along with other gases such argon, neon, and possibly others in different partial pressures that add up to a total pressure P. Gas bottles 110 and 112 are connected to the master oscillator 102 and power amplifier 104 through valves 114 to allow for replenishment of the gas in the laser chambers when desired. In an ArF laser, gas bottle 110 typically might contain a mixture of gases including fluorine, argon and one or more other rare gases, known as an "M1 mix" or "tri-mix," while gas bottle 112 might contains a mixture of argon and one or more other gases, but no fluorine, known as an "M2 mix" or "bi-mix." A controller 116, such as a processor or logic circuit, operates the valves 114 to transfer gases from bottles 110 and 112 into the laser chambers of the master oscillator 102 and power amplifier 104 in a refill or inject, or to bleed gas from the laser chambers when necessary. Bled gas is typically not returned to the bottles but is vented at 118.

As is known in the art, two bottles of gas are needed, since the fluorine in gas bottle 110 is at a particular partial pressure that is typically higher than that desired for laser operation. In order to add the fluorine to the laser chamber of the master oscillator 102 or power amplifier 104 at a desired lower partial pressure, the gas in bottle 110 must be diluted, and the non-halogen containing gas in bottle 112 is used for this purpose.

Although not shown, valves 114 typically include two valves for each laser chamber, an "injection" valve that allows gas to pass into and out of each chamber a first rate, and a "chamber fill" valve that allows gas to pass into and out of each chamber at a second, and faster, rate.

As described above, when a refill of the laser chambers is performed, all of the gas in the chambers is replaced, and an attempt is made to arrive at a specific pressure and concentration of fluorine in each chamber. Since refills are typically the same for all lasers of a given model, a refill is sometimes followed by gas optimization, so that the condition of the gas is optimized for the specific laser in question. As above, this is commonly done by an engineer who test-fires the laser, observes the operating parameters, and attempts to adjust the gas conditions in one or both laser chambers to compensate for any deviation from the desired parameters. Such adjustments are typically done manually, relying on the engineer's experience and judgment.

As with such prior manual optimization processes, the automatic optimization process described herein is performed after the laser chambers are refilled. In the embodiment described herein, the gas in the master oscillator laser chamber remains fixed after the refill, and only the gas in the amplifier laser chamber is adjusted. Since the amplifier laser chamber presumably contains a desired concentration of fluorine at the end of the refill, only bleeds of gas are allowed during the optimization; no injects are permitted at this point as they might change the fluorine concentration.

The method is typically implemented in software, running on a processor, such as controller 116 in FIG. 1, which receives certain parameters including the measurements of the temperature and pressure in the chambers as inputs and controls operation of the valves.

Figure 2:
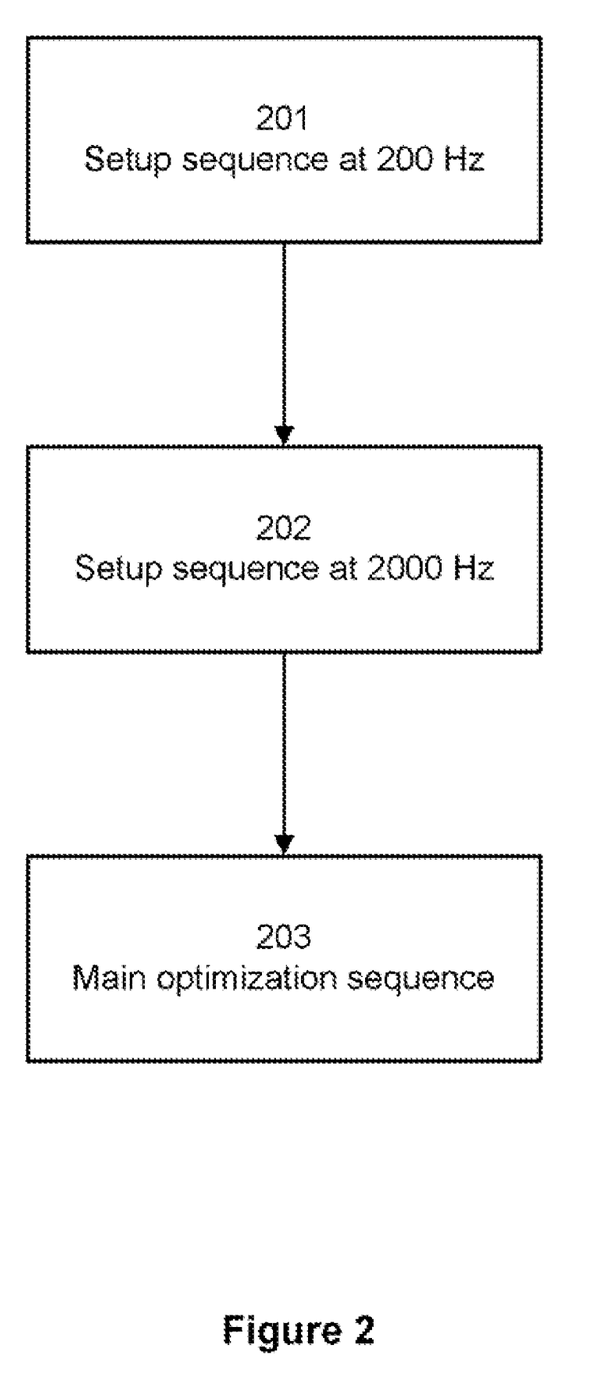
FIG. 2 is a simplified flowchart showing the main steps of a method of an automatic gas optimization of an amplifier laser chamber of a dual chamber gas laser, such as a MOPA excimer laser, according to one embodiment.

FIG. 2 is a simplified flow chart showing one embodiment of a process for automatically optimizing the gas in the power amplifier chamber of a dual chamber gas laser, such as a MOPA excimer laser. As illustrated and discussed below, the process contains two distinct sequences, a system setup sequence which is run twice (steps 201 and 202), and a main optimization sequence (step 203).

During optimization, an attempt is made to obtain a constant energy output; however, this is not always possible, and in some cases the output energy will be higher than desired. For this reason, in order to prevent damage to the optics of the laser system, in the first setup sequence the laser is operated at a very low frequency, resulting in a low output power. Once it is clear that the laser is operating properly, the second setup sequence may be run at a higher output power, and then the main optimization sequence may be run at approximately the expected output power of the laser in operation.

In one embodiment, during the system setup sequence the laser is operated in continuous mode, in which the laser continuously fires pulses, rather than in a burst mode in which the laser fires pulses in groups, although this is not required. For example, a laser designed to generate pulses of 10 millijoules (mJ) each in continuous mode at a pulse rate of 6 kilohertz (kHz), i.e., 6000 pulses per second, is considered to have a maximum intended output of 60 watts, while one generating pulses of 15 mJ each at the same rate is rated to output 90 watts. In some cases, such a laser will allow a user to select a higher pulse energy. While the user would presumably also select a lower pulse rate, if the laser were to start operating in continuous wave mode with a higher pulse energy at the 6 kHz rate, damage to the laser could result. Thus, the setup sequence starts at a rate selected to insure that the output power is well under the laser's maximum intended output until the gas is optimized to allow for such output.

It is noted that various values stated herein are those used with certain MOPA lasers from Cymer, Inc., of San Diego, Calif., although many other lasers will use similar values. One of skill in the art will be able to apply the principles described herein to excimer lasers from other manufacturers or having different operating values.

Since the low output energy of the first setup sequence may be outside of normal operating parameters, warnings for errors in energy output may be disabled or, alternatively, simply ignored. Similarly, warnings for wavelength and bandwidth that are outside of normal operation may also be disabled or ignored during the optimization process.

Turning to FIG. 2, as stated above, at step 201a first setup sequence is run at a low frequency. In one embodiment using the stated example of a 60 watt laser able to generate pulses of 10 mJ each at a pulse rate of 6 kHZ, the first setup sequence may be run at, for example, 200 Hz.

As above, the rate of 200 Hz is selected to insure that the output power during the first setup sequence is sufficiently low that there can be no damage to the optics of the system. Running the first setup sequence at a continuous pulse rate of 200 Hz with 10 mJ pulses will result in an output power of 2 watts. This is well below the rated output of 60 watts, and low enough that there will be no damage to the optics of the laser even if the pulses generated initially are at an energy of greater than 10 mJ each. One of skill in the art will appreciate that the pulse rate may be altered depending upon the parameters of a particular laser which is the subject of the optimization process.

At step 202, a second setup sequence is run with increased output power of the laser by increasing the continuous pulse rate. For example, the pulse rate may be increased by a factor of 10, to 2000 Hz, resulting in an output power of 20 watts in the example above.

At step 203, optimization is completed by running the main optimization sequence. As discussed below, the main optimization sequence is preferably run at a target output power that is approximately the output power at which it is expected the laser will be operated. Each of these sequences will be explained in more detail.

Figure 3:
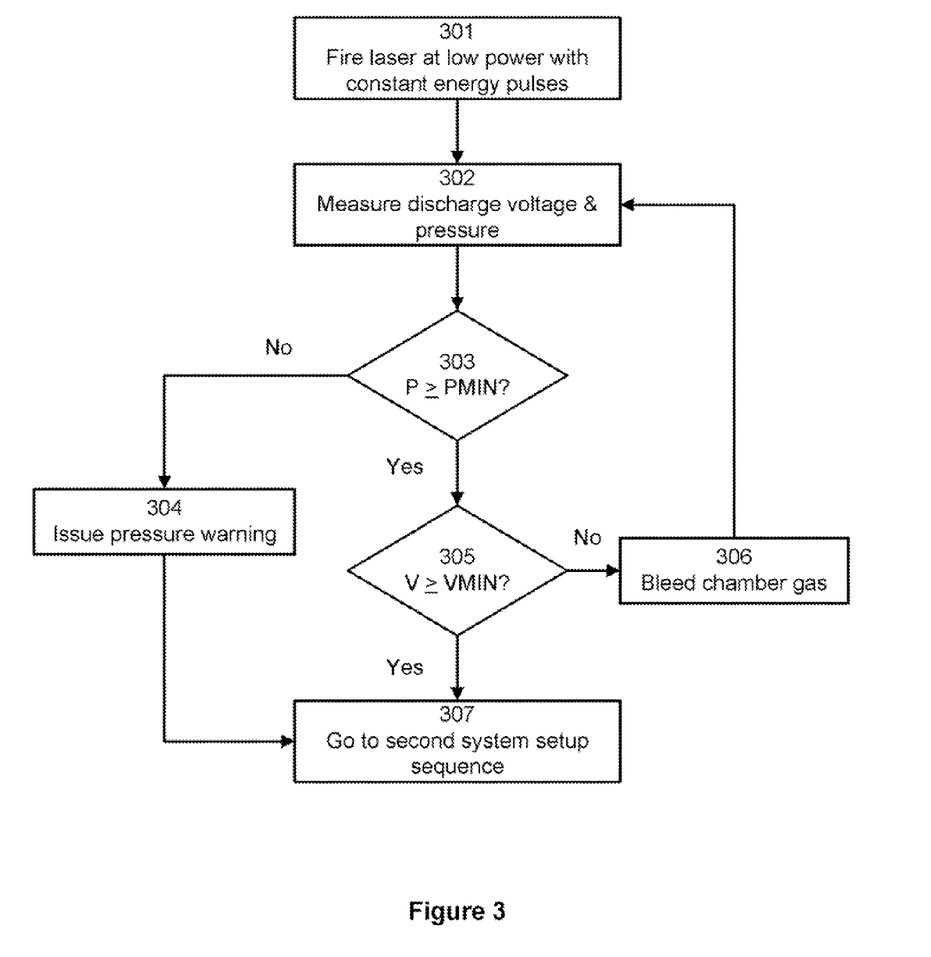
FIG. 3 is a simplified flowchart showing more detailed steps of one embodiment of a first system setup sequence from FIG. 2.

FIG. 3 is a flowchart showing more detailed steps of one embodiment of the first setup sequence 201. At step 301, as described above, the laser is fired in continuous mode at a constant pulse energy output, or target, at a rate selected to result in a power output well below the nominal power at which the laser is expected to be used in manufacturing operations. As above, for a laser with a maximum pulse rate of 6 KHz, and an energy of 10 mJ per pulse, the first setup sequence may be run, for example, at 200 Hz.

Next, at step 302, the discharge voltage required to produce the laser pulses at the desired output energy of 10 mJ is measured, and the pressure in the power amplifier laser chamber is measured. At step 303, it is determined whether the pressure in the power amplifier chamber is greater than or equal to a minimum value PMIN.

If the measured pressure is below PMIN, a warning is issued to the user at step 304 and the process proceeds to the second setup sequence at step 307.

If the pressure is equal to or above PMIN, it is next determined at step 305 whether the discharge voltage is greater than or equal to a minimum value VMIN. If the voltage equals or exceeds VMIN, then the process again proceeds to the second setup sequence at step 307.

If at step 305 the voltage is not greater than VMIN, then at step 306 the amplifier laser chamber gas is bled to reduce the pressure by a fixed increment. Bleeding gas reduces the pressure, which increases the discharge voltage. After a wait of a few seconds to allow for transients, in one embodiment 3 seconds, the process returns to step 302, and the voltage and pressure are measured again. When step 305 is reached again, if the discharge voltage is now greater than or equal to VMIN (and the pressure greater than PMIN), the process again moves to the second setup sequence at step 307.

If the discharge voltage is still less than VMIN, step 306 is repeated and the gas is again bled, and the process again returns to step 302 for measurement of the discharge voltage and pressure. In one embodiment, the gas is bled by the same increment each time; in other embodiments the bleed increment may be changed at each iteration, for example based upon the change in the discharge voltage as a result of the prior bleed. Steps 302, 303, 305 and 306 will repeat until one of the conditions leading to step 307 and the second setup sequence occurs, i.e., the pressure is less than PMIN, or the pressure is greater than or equal to PMIN and the discharge voltage is greater than or equal to VMIN.

In one embodiment, the bleeding of gas from the amplifier laser chamber is accomplished by opening the fill valve for the amplifier laser chamber for a fixed period of time, rather than attempting to measure the actual drop in pressure. The system may provide a default value for the period of time that the valve is to be opened, or allow the user to set a value.

The values of VMIN and PMIN are set so as to insure that the laser remains within safe operating parameters. The physics of the laser dictate a minimum safe discharge voltage; if the voltage goes below this, it is an indication that the output energy of the laser is too high, and that the discharge voltage is being driven down to pull the output energy down. Since this condition may result in damage to the laser, the laser is typically automatically shut off if the discharge voltage goes below this minimum value. To insure that this value of discharge voltage is not reached, VMIN is set higher than the physical limit, in one embodiment by approximately 50 volts.

Similarly, the physics of the laser also dictate a minimum pressure below which the laser will not operate safely. The value of PMIN is thus also set above this pressure, in one embodiment by approximately 15 kilopascals (kPa). The bleed time, 0.6 seconds in this example, is set to be such that a bleed results in a pressure decrease of less than 15 kPa so that if the pressure is determined to be above PMIN at step 303 and a bleed then occurs, the pressure will still be above the physical limit needed for safe operation of the laser.

In one embodiment, there are default values for VMIN and MIN, for example, 910 volts for VMIN, and 220 kPa for PMIN. In other embodiments, the user may vary these parameters.

Figure 4:
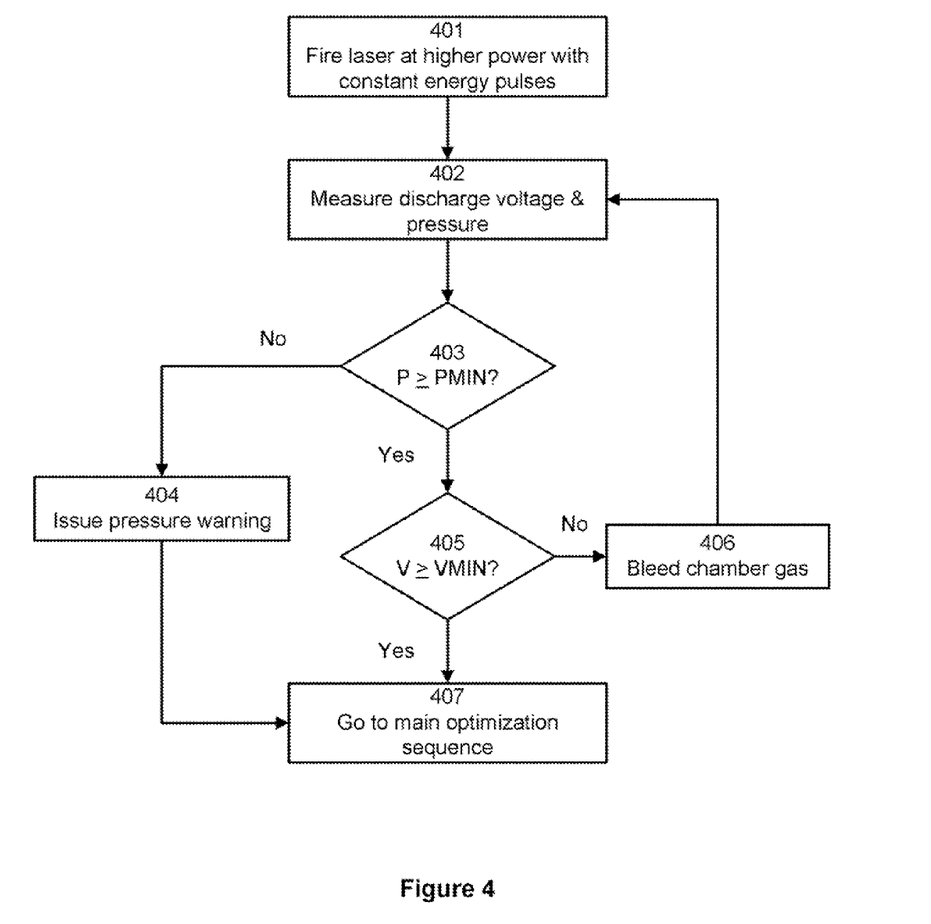
FIG. 4 is a simplified flowchart showing more detailed steps of one embodiment of a second system setup sequence from FIG. 2.

FIG. 4 is a flowchart showing more detailed steps of one embodiment of the second setup sequence 202. The second setup sequence is nearly identical to the first setup sequence of FIG. 3. At step 401 the laser is again fired in continuous mode, but at a higher pulse rate, resulting in a higher output power. However, in one embodiment, the second setup sequence may still be run at an output power less than that expected in normal operation of the laser.

In one embodiment, in the second setup sequence the laser is run at a pulse rate of 10 times the initial rate, i.e., in this example 2000 Hz, or 10 times the 200 Hz rate of the first setup sequence. Assuming the 10 ml per pulse energy of the above example, this will increase the expected output power to 20 watts, still well below the rated output of the laser, and also possibly below the normal expected output energy of the laser in operation. The target energy per pulse is preferably constant for all of the sequences, although this could possibly be varied if desired.

The pulse rate affects the required discharge voltage, which is expected to decrease at the higher rate used for the second setup sequence, here 2000 Hz. Thus, while the discharge voltage may be over VMIN during the first setup sequence, it may fall during the second setup sequence, and thus require that more gas be bled to raise the discharge voltage above VMIN at the higher repetition rate.

The steps shown in FIG. 4 are the same as those shown in FIG. 3, and the second setup sequence runs in the same way as described above with reference to the first setup sequence. Now, however, when the end of the second setup sequence is reached at step 407, the process goes to the main optimization sequence. Thus, during the second setup sequence, at some point either the discharge voltage will be equal to or greater than VMIN and the pressure equal to or greater than PMIN, or the pressure will fall below PMIN. Either of these conditions ends the second setup sequence, and the process goes to the main optimization sequence at step 407.

Once the second setup sequence has been run, the gas condition is sufficient to prevent the main optimization sequence from resulting in damage to the laser. The main optimization sequence is then run to optimize the gas condition for the expected operating condition of the laser.

Figure 5:
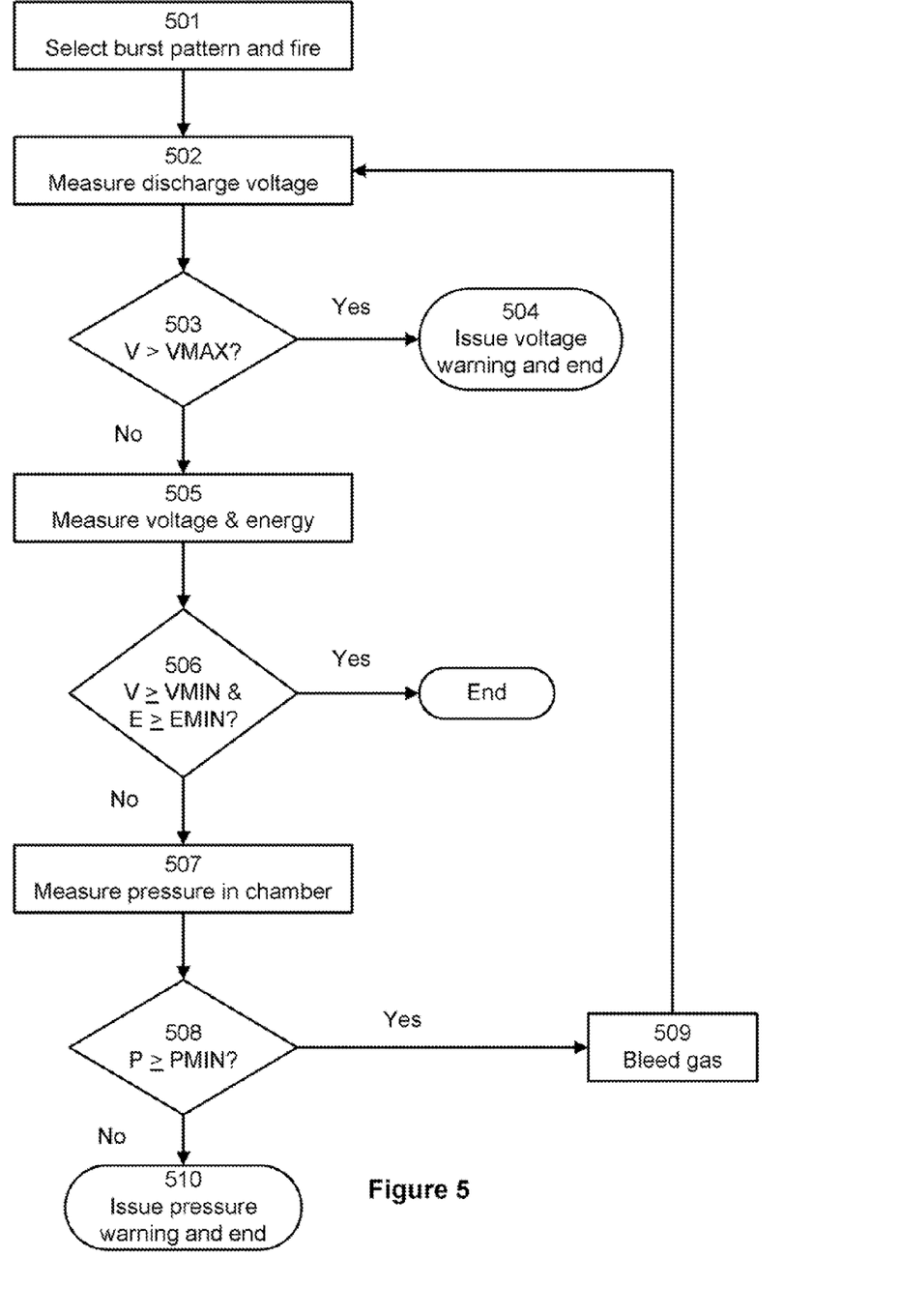
FIG. 5 is a simplified flowchart showing more detailed steps of one embodiment of a main optimization sequence from FIG. 2.

FIG. 5 is a simplified flow chart of one embodiment of the main optimization sequence. During the main optimization sequence the laser is fired in a burst pattern, rather than in the continuous wave mode of the setup sequence. At step 501, a burst pattern is selected. The burst pattern is intended to approximate both the expected output power and how the laser will actually be fired by a typical customer, and may in some cases represent the pattern that the laser manufacturer believes yields the best performance in operation.

A burst pattern is typically specified by three parameters, the repetition rate, the length of the burst, and the time between bursts. A burst pattern for the main optimization sequence may be selected by either the laser manufacturer or the user, although a default setting may be stored in memory, and once selected it is not changed during the optimization process. For example, in the case of the laser above generating pulses at 10 mJ each at a maximum rate of 6 KHz for a maximum intended output of 60 watts, a burst pattern of 600 pulses per burst at the 6 KHz rate with 100 msec between bursts may be used. This represents a duty cycle of 50% of maximum pulse rate, so that at 10 mJ per pulse the power output will be 30 watts.

At step 502, the discharge voltage is again measured, and now compared to a maximum voltage VMAX at step 503. If the voltage is over VMAX, the process terminates, as this current gas condition is the best result that can be obtained by the optimization process. In one embodiment, a warning may also be issued to the user at step 504 that the voltage is too high, so that the user may continue to monitor the laser chamber pressure if desired.

As with VMIN and PMIN, it is known that there is a true maximum discharge voltage defined by the physical limit of the laser. It is also known that during operation, the discharge voltage tends to increase as fluorine is consumed. Thus, the value of VMAX is set to be well below the physical limit of the laser to allow for the increase in voltage during operation. For example, a laser might have a physical limit at around 1150 volts, and VMAX might be set 100 volts lower, or 1050 volts, while as above, VMIN for such a laser might be around 910 volts.

If the voltage is not over VMAX, at step 505 the discharge voltage is again measured, as is the master oscillator output energy. At step 506, the discharge voltage is again compared to the same minimum voltage VMIN used in the setup sequence above, although it may be compared to a different reference value if desired. The master oscillator energy is also compared to a minimum value EMIN. If the discharge voltage is equal to or greater than VMIN, and the master oscillator energy is equal to or greater than EMIN, then again the process terminates, again since this is the best result that the optimization process can achieve.

If either the discharge voltage or the master oscillator energy does not meet the respective minimum value, then at step 507, the pressure of the gas in the power amplifier laser chamber is again measured. At step 508, it is determined whether the gas pressure has fallen below the same value of PMIN used in the setup sequence above. If the pressure is below PMIN, a warning is again issued at step 510 and the optimization sequence again ends.

However, if the pressure in the amplifier laser chamber still equals or exceeds PMIN, then at step 509 the gas in the amplifier laser chamber is bled, again by a fixed increment. As above, this may be done by opening the fill valve for a fixed period of time. The discharge voltage will again increase as the pressure decreases, which also results in the master oscillator energy increasing. After a short wait, for example 5 seconds, to allow transients to settle, the process returns to step 502 and the discharge voltage is again measured. Steps 502 to 509 are repeated until one of the exit points is reached.

The values of VMIN and PMIN used during the main optimization sequence may be the same as those used during the setup sequences, for the same reason, i.e., to provide sufficient margin from the safe operating limits of the laser.

At this point the gas in the amplifier laser chamber is considered to be optimized for normal burst mode operation of the specific laser, and normal operation may commence at the best possible condition of pressure and fluorine concentration. The optimal gas condition provides a good basis for subsequent injects of fluorine containing gas into the chambers to compensate for the consumption of fluorine by operation of the laser, and should allow the laser to operate longer before requiring a full refill. Various ways of performing such injects are well known to those of skill in the art.

In practice, the automated gas optimization process described herein adds less than 5 minutes to the time it takes to refill the laser chambers. With an automated refill process, an entire refill and optimization may be accomplished in less than 25 minutes, compared to an hour or more for prior art refills and manual optimization. Further, the optimization process herein should result in the best possible initial gas condition when the automated refill process results in a highly accurate fluorine concentration.

Based upon tests, it is believed that an automatic optimization process according to the described method can obtain an optimal gas condition in the amplifier laser chamber that is difficult to accomplish with manual optimization processes. In addition, such an automated optimization process does not require further adjustment by an engineer, and results in a very low amount of excess gas that must be bled from the laser chambers.

The described system and method can also be a valuable diagnostic tool, as the final values of the laser parameters after gas optimization, such as voltage, master oscillator energy, etc., are significant in determining the condition of the laser. Tracking the results of each gas optimization during the laser's life span can provide valuable information on how the laser evolves over time, and potentially be of value in future laser design and improvement.

The disclosed method and apparatus has been explained above with reference to several embodiments. Other embodiments will be apparent to those skilled in the art in light of this disclosure. Certain aspects of the described method and apparatus may readily be implemented using configurations or steps other than those described in the embodiments above, or in conjunction with elements other than or in addition to those described above.

For example, it will be understood by those skilled in the art that, while the preferred embodiment is a master oscillator-power amplifier multi-chambered excimer or molecular fluorine gas discharge laser system ("MOPA") it is anticipated that the system and method may also be used with other oscillator/amplifier configurations, such as a master oscillator-power oscillator ("MOPO"), a power oscillator-power amplifier ("POPA") or a power oscillator-power oscillator ("POPO") configuration, or the like. It will also be understood that in each of such configurations the output of the first oscillator stage is amplified in some fashion in the second stage, regardless of whether the second stage is a power amplifier or a power oscillator.

Similarly, unless otherwise indicated specifically to the contrary reference to a master oscillator stage or chamber ("MO") in the Specification or the appended claims, and/or a power amplifier stage or chamber ("PA") in the Specification or appended claims, shall be considered to be broad enough to cover any oscillator first stage or chamber feeding an output into any amplifier second stage or chamber for amplification, and the term oscillator chamber or oscillator stage is broad enough to corner any such oscillator stage and the term amplifier chamber or stage is broad enough to cover any such amplifier stage.

It should also be appreciated that the described method and apparatus can be implemented in numerous ways, including as a process, an apparatus, or a system. The methods described herein may be implemented by program instructions for instructing a processor to perform such methods, and such instructions recorded on a computer readable storage medium such as a hard disk drive, floppy disk, optical disc such as a compact disc (CD) or digital versatile disc (DVD), flash memory, etc. The methods may also be incorporated into hard-wired logic if desired. It should be noted that the order of the steps of the methods described herein may be altered and still be within the scope of the disclosure.

These and other variations upon the embodiments are intended to be covered by the present disclosure, which is limited only by the appended claims.

What is claimed is:

1. A dual chamber gas discharge laser light source, comprising:
    a master oscillator having a laser chamber containing a lasing medium gas comprising a halogen;
    an amplifier having a laser chamber containing a lasing medium gas comprising a halogen;
    a gas optimization system including a controller automatically executing an optimization scheme after a refill of the gas in the amplifier laser chamber, the optimization scheme comprising:
        a first sequence in which the laser is fired in continuous mode at a first rate and target energy while measuring the discharge voltage, and, if the discharge voltage is below a predetermined minimum value, bleeding gas from the amplifier chamber until the discharge voltage is equal to or greater than the minimum value;
        a second sequence in which the laser is fired in continuous mode at a second rate and target energy while measuring the discharge voltage, and, if the discharge voltage is below the predetermined minimum value, bleeding gas from the amplifier chamber until the discharge voltage is equal to or greater than the minimum value; and
        a third sequence in which the laser is fired in bursts at a target energy while measuring the discharge voltage and master oscillator output energy, and, if the discharge voltage is below the predetermined minimum value, or the output energy is below another predetermined minimum value, bleeding gas from the amplifier chamber until both the discharge voltage and the output energy are equal to or greater than the respective predetermined minimum values.

2. The dual chamber gas discharge laser light source of claim 1 wherein the halogen comprises fluorine.

3. The dual chamber gas discharge laser light source of claim 1 wherein the rate at which the laser is fired during the first sequence is calculated to result in a power output of approximately a few percent of the maximum power output of the laser.

4. The dual chamber gas discharge laser light source of claim 3 wherein the rate at which the laser is fired during the second sequence is approximately 10 times the rate at which the laser is fired during the first sequence.

5. The dual chamber gas discharge laser light source of claim 1 wherein the bursts fired by the laser during the third sequence are calculated to result in a power output that is approximately equal to the power output which the laser is expected to generate during normal operation.

6. The dual chamber gas discharge laser light source of claim 1 wherein the optimization scheme further comprises bleeding gas from the amplifier chamber in determined increments.

7. The dual chamber gas discharge laser light source of claim 1 wherein the optimization scheme further comprises measuring the pressure in the amplifier chamber during the first sequence and, if the pressure drops below a predetermined value, stopping the first sequence and commencing the second sequence.

8. The dual chamber gas discharge laser light source of claim 1 wherein the optimization scheme further comprises measuring the pressure in the amplifier chamber during the second sequence and, if the pressure drops below a predetermined value, stopping the second sequence and commencing the third sequence.

9. The dual chamber gas discharge laser light source of claim 1 wherein the optimization scheme further comprises measuring the pressure in the amplifier chamber during the third sequence and, if the pressure drops below a predetermined value, stopping the third sequence.

10. The dual chamber gas discharge laser light source of claim 1 wherein the optimization scheme further comprises stopping the third sequence if the discharge voltage is greater than a predetermined maximum value during the third sequence.

11. A method of automatically optimizing the gas in the amplifier laser chamber of a dual chamber gas discharge laser light source having a master oscillator and an amplifier, each of the master oscillator and amplifier having a laser chamber containing a lasing medium gas comprising a halogen, the method comprising the steps of:
    firing the laser in continuous mode at a first rate and target energy while measuring the discharge voltage, and, if the discharge voltage is below a predetermined minimum value, bleeding gas from the amplifier chamber until the discharge voltage is equal to or greater than the minimum value;
    firing the laser in continuous mode at a second rate and target energy while measuring the discharge voltage, and, if the discharge voltage is below the predetermined minimum value, bleeding gas from the amplifier chamber until the discharge voltage is equal to or greater than the minimum value; and
    firing the laser in bursts at a target energy while measuring the discharge voltage and master oscillator output energy, and, if the discharge voltage is below the predetermined minimum value, or the output energy is below another predetermined minimum value, bleeding gas from the amplifier chamber until both the discharge voltage and the output energy are equal to or greater than the respective predetermined minimum values.

12. The method of claim 11 wherein the halogen comprises fluorine.

13. The method of claim 11 wherein the rate at which the laser is fired during the first sequence is calculated to result in a power output of approximately a few percent of the maximum power output of the laser.

14. The method of claim 13 wherein the rate at which the laser is fired during the second sequence is approximately 10 times the rate at which the laser is fired during the first sequence.

15. The method of claim 11 wherein the bursts fired by the laser during the third sequence are calculated to result in a power output that is approximately equal to the power output which the laser is expected to generate during normal operation.

16. The method of claim 11 wherein the optimization scheme further comprises bleeding gas from the amplifier chamber in determined increments.

17. The method of claim 11 wherein the optimization scheme further comprises measuring the pressure in the amplifier chamber during the first sequence and, if the pressure drops below a predetermined value, stopping the first sequence and commencing the second sequence.

18. The dual chamber gas discharge laser light source of claim 11 wherein the optimization scheme further comprises measuring the pressure in the amplifier chamber during the second sequence and, if the pressure drops below a predetermined value, stopping the second sequence and commencing the third sequence.

19. The method of claim 11 wherein the optimization scheme further comprises measuring the pressure in the amplifier chamber during the third sequence and, if the pressure drops below a predetermined value, stopping the third sequence.

20. The method of claim 11 wherein the optimization scheme further comprises stopping the third sequence if the discharge voltage is greater than a predetermined maximum value during the third sequence.

21. A non-transitory computer-readable medium having embodied thereon a program, the program being executable by a processor to perform a method of automatically optimizing the gas in the amplifier laser chamber of a dual chamber gas discharge laser light source having a master oscillator and an amplifier, each of the master oscillator and amplifier having a laser chamber containing a lasing medium gas comprising a halogen, the method comprising the steps of:

firing the laser in continuous mode at a first rate and target energy while measuring the discharge voltage, and, if the discharge voltage is below a predetermined minimum value, bleeding gas from the amplifier chamber until the discharge voltage is equal to or greater than the minimum value;

firing the laser in continuous mode at a second rate and target energy while measuring the discharge voltage, and, if the discharge voltage is below the predetermined minimum value, bleeding gas from the amplifier chamber until the discharge voltage is equal to or greater than the minimum value; and firing the laser in bursts at a target energy while measuring the discharge voltage and master oscillator output energy, and, if the discharge voltage is below the predetermined minimum value, or the output energy is below another predetermined minimum value, bleeding gas from the amplifier chamber until both the discharge voltage and the output energy are equal to or greater than the respective predetermined minimum values.

* * * * *